United States Patent
Di Giulio

(10) Patent No.: US 7,797,312 B2
(45) Date of Patent: Sep. 14, 2010

(54) DATABASE QUERY PROCESSING METHOD AND SYSTEM

(75) Inventor: Domenico Di Giulio, Rome (IT)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 11/695,731

(22) Filed: Apr. 3, 2007

(65) Prior Publication Data

US 2007/0244852 A1    Oct. 18, 2007

(30) Foreign Application Priority Data

Apr. 6, 2006   (EP)  ................................. 06112322

(51) Int. Cl.
*G06F 17/30* (2006.01)
*G06F 7/00* (2006.01)

(52) U.S. Cl. .................. 707/722; 707/786
(58) Field of Classification Search ............... 707/2
See application file for complete search history.

(56) References Cited

U.S. PATENT DOCUMENTS

| | | | |
|---|---|---|---|
| 5,276,870 A | | 1/1994 | Shan et al. |
| 5,367,675 A | | 11/1994 | Cheng et al. |
| 5,878,426 A | | 3/1999 | Plasek et al. |
| 5,893,091 A | | 4/1999 | Hunt et al. |
| 5,960,425 A | * | 9/1999 | Buneman et al. ............ 707/3 |
| 5,978,789 A | | 11/1999 | Griffin et al. |
| 6,067,552 A | | 5/2000 | Yu |
| 6,195,661 B1 | | 2/2001 | Filepp et al. |
| 6,253,195 B1 | * | 6/2001 | Hudis et al. ............... 707/2 |
| 6,289,334 B1 | | 9/2001 | Reiner et al. |
| 6,546,388 B1 | | 4/2003 | Edlund et al. |
| 6,618,719 B1 | | 9/2003 | Andrei |
| 6,757,670 B1 | | 6/2004 | Inohara et al. |
| 7,287,033 B2 | * | 10/2007 | Shadmon et al. ............ 707/101 |
| 7,333,981 B2 | | 2/2008 | Dettinger et al. |
| 7,370,030 B2 | | 5/2008 | Dettinger et al. |
| 7,469,248 B2 | | 12/2008 | Agrawal et al. |

(Continued)

FOREIGN PATENT DOCUMENTS

EP          07478378 A1     12/1996

(Continued)

OTHER PUBLICATIONS

Chiang Lee, Chi-Sheng Shih, and Yaw-Hiei Chen; Optimizing large join queries using a graph-based approach; IEEE transaction o knowledge and data engineering; Mar./Apr. 2001; vol. 13, No. 2; 298-315; Retrieved from IEEE digital library.*

(Continued)

*Primary Examiner*—Sathyanarayan Pannala
(74) *Attorney, Agent, or Firm*—Jeffrey S. LaBaw

(57) ABSTRACT

A database comprising a plurality of tables is interrogated by generating a database query, and a data map, the data map describing the structure of table instances implicated in the database query. Next, the database query is submitted to the database. A response is received from the database. The data map is traversed so as to iteratively apply a data extraction process to components of the response corresponding to each table instance associated with the database query, thereby extracting the required data from the response.

13 Claims, 1 Drawing Sheet

U.S. PATENT DOCUMENTS

| | | | | |
|---|---|---|---|---|
| 7,478,087 | B2* | 1/2009 | Lin et al. | 707/4 |
| 7,680,787 | B2 | 3/2010 | Di Giulio | |
| 2001/0049685 | A1 | 12/2001 | Carey et al. | |
| 2002/0078015 | A1* | 6/2002 | Ponnekanti | 707/1 |
| 2003/0172010 | A1* | 9/2003 | Butani et al. | 705/29 |
| 2005/0065963 | A1* | 3/2005 | Ziemann et al. | 707/102 |
| 2005/0065965 | A1* | 3/2005 | Ziemann et al. | 707/102 |
| 2005/0182756 | A1* | 8/2005 | Eppley et al. | 707/3 |
| 2005/0210000 | A1 | 9/2005 | Michard | |
| 2006/0122990 | A1* | 6/2006 | Smith et al. | 707/3 |
| 2006/0195420 | A1* | 8/2006 | Kilroy | 707/3 |
| 2006/0195427 | A1* | 8/2006 | Kilroy | 707/3 |
| 2006/0265385 | A1 | 11/2006 | Agrawal et al. | |
| 2008/0243767 | A1 | 10/2008 | Naibo et al. | |

FOREIGN PATENT DOCUMENTS

| | | | |
|---|---|---|---|
| JP | 2006053798 A | * | 2/2006 |

OTHER PUBLICATIONS

Ravi Mukkamala, and Rong Lin; Improving database performance through query standarization; Prosceedings—1989 Southeastcon. Energy and information technologies in the southeast; vol. 3; 1321-1325; Retrieved from IEEE digital library.*

Yuquing Wu, Jignesh M. Patel, and H. V. Jagadish; Structured join order selection for XML query optimization; Prosceedings of the 19th International Conference on Data Engineering; Mar. 5-8, 2003; 443-454; Retrieved from IEEE digital library.*

Jun Rao and Kenneth A. Ross; Reusing invariants: a new strategy for correlated queries; 1998; International Conference on Management of Data, Proceedings of the 1998 ACM SIGMOD International Conference on Management of Data; pp. 37-48; retrieved from ACM Digital Library.

Yingying Tao, Qiang Zhu, and Calisto Zuzarte; Exploiting common subqueries for complex query optimization; 2002; IBM Centre for Advanced Studies Conference, Proceedings of the 2002 conference of the Centre for Advanced Studies on Collaborative research; retrieved from ACM Digital Library, pp. 1-14.

Notice of Allowance dated Oct. 30, 2009 in U.S. Appl. No. 11/696,382.

Supplemental Response or Amendment dated Oct. 6, 2009 in U.S. Appl. No. 11/696,382.

Response to Office Action dated Jul. 7, 2009 in U.S. Appl. No. 11/696,382.

Office Action dated Apr. 13, 2009 in U.S. Appl. No. 11/696,382.

Preliminary Amendment dated Apr. 4, 2007 in U.S. Appl. No. 11/696,382.

Pirahesh, et al., "Extensible/Rule Based Query Rewrite Optimization in Starbust" retrieved from ACM Digital Library, pp. 39-48, Jun. 1992.

Singh Mumick, et al., "Implementation of magic-sets in a relational database system". 1994 ACM SIGMOD International Conference on Management of Data, Minneapolis, MN pp. 24-27 May 1994.

* cited by examiner

DATABASE QUERY PROCESSING METHOD AND SYSTEM

FIELD OF THE INVENTION

The present invention relates to the field of relational database query techniques.

BACKGROUND OF THE INVENTION

Software systems that use relational databases to support persistence of data typically have to deal with a number of complex SQL queries, and need a lot of logic to implement fetching of different query results and create the corresponding data structures.

In this context, a very common problem is that the amount of code that executes fetching of data from database queries increases with the number of queries, and the more the application uses complex SQL queries, the harder it is to reuse this code. Even if trying to use base functions to fetch subsets of the query results independently, there is still the need to write for each query some "glue" code that assembles all the results returned from base functions into the final expected structure.

The Java Platform, Enterprise Edition or Java EE (formerly known as Java 2 Platform, Enterprise Edition or J2EE up to version 1.4), is a programming platform for developing and running distributed multi-tier architecture Java applications, based largely on modular software components running on an application server (Java and all Java-based trademarks and logos are trademarks of Sun Microsystems, Inc. in the United States, other countries, or both.)

Within the context of J2EE applications, Enterprise JavaBeans (EJBs) are one of the several specifications defined by the J2EE standard. An EJB is a server-side component that encapsulates the business logic of an application, which can run in a special environment called an EJB container. The EJB container manages every aspect of an enterprise bean at runtime including remote access to the bean, security, persistence, transactions, concurrency, and access to and pooling of resources.

With container-managed persistence, the programmer defines how to map the representation on the Java platform to the database model, and the container generates the required code to implement the mapping. While defining this mapping, the programmer has the ability to specify multiple tables and relationships and their mappings to the EJBs, so that the container can generate queries involving multiple tables. However, the EJB container can automatically generate only simple queries involving a small number of tables, and has several limitations in the ability to create and manage complex queries involving subqueries, dynamic clauses, inheritance relationships, etc.

SUMMARY OF THE INVENTION

According to the present invention, a database comprising a plurality of tables is interrogated by generating a database query, and a data map, the data map describing the structure of table instances implicated in the database query: Next, the database query is submitted to the database: A response is received from the database: The data map is traversed so as to iteratively apply a data extraction process to components of the response corresponding to each table instance associated with the database query, thereby extracting the required data from the response.

BRIEF DESCRIPTION OF THE DRAWINGS

Embodiments of the present invention will now be described by way of example with reference to the accompanying drawings in which like references denote similar elements, and in which.

DETAILED DESCRIPTION

Figure 1:
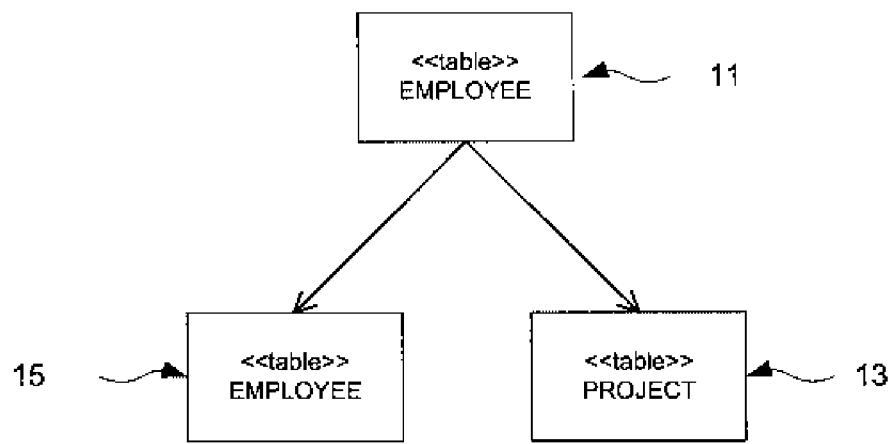
FIG. 1 shows a formal representation of the table instances of this a representation of embodiments of the invention.

There is provided a distributed fetching algorithm to fetch results of database queries using "table paths". A set of "intelligent" fetch functions is defined, one for each object in the application, in such a way that each function is able to locate the right occurrence of the database table from which it must fetch the data, then fetch the related columns and next recursively invoke the appropriate "fetch" function for every associated object. This way, the logic that implements fetching of data from the appropriate tables and creates the structures that result from execution of the query is not query-dependent, and can be reused for every SQL query in the application.

Generic functions are instructed to locate the query-specific names used to alias database tables in specific SQL queries. This is accomplished by defining, together with each SQL query, a "table path" for every table instance involved in the query, together with a mapping to the alias used for that instance. The alias of the appropriate table instance from which a "fetch" function must fetch the data is found by executing a search over the set of "table paths", looking for the table path corresponding to that invocation of the function. The "table path" describes a path including all the tables that are "touched" when navigating the join tree from the first table to be considered to the current one. Thus the following steps may be defined in a method of interrogating a database: generating a database query, and a data map describing the structure of table instances implicated in said database query. The map may take the form of a recursive data structure such as a tree. The database query is submitted to the database, and a response received from the database. The data map is traversed so as to iteratively apply an extraction process such as a fetch function to components of the response corresponding to each table instance implicated in the database query, thereby extracting required data from the response.

Consider the following example, including a table of employees, and a table of projects. Each row in the EMPLOYEE table references a row in the PROJECT table and another row of the EMPLOYEE table, to model the employee's manager.

EMPLOYEE(ID, NAME, AGE, MANAGER_ID, PROJECT_ID) PROJECT(ID, NAME, BUDGET)

Tables 1 and 2 below are examples of tables according to these schema which will be used in the later examples:

| ID | NAME | AGE | MANAGER_ID | PROJECT_ID |
|---|---|---|---|---|
| 101 | Vladimir Ilic Lenin | 75 | 102 | 10 |
| 102 | Bill Gates | 60 | NULL | 10 |

-continued

| ID | NAME | AGE | MANAGER_ID | PROJECT_ID |
|----|------|-----|------------|------------|
| 103 | Tom Payne | 55 | 102 | 10 |
| 104 | Watt Tyler | 21 | 102 | 12 |

PROJECT

| ID | NAME | BUDGET |
|----|------|--------|
| 12 | Fortune | 1,000,000 |
| 11 | Glory | 2,000,000 |
| 10 | IBM Tivoli Workload Scheduler | 5,000,000 |

MANAGER_ID references the ID column on the EMPLOYEE table, while PROJECT_ID references the ID column in the PROJECT table. Now consider the following query, used to get information about each employee with his/her manager and the project on which he/she is currently working:

select E.ID, E.NAME, E.AGE, E.MANAGER_ID, E.PROJECT_ID M.ID, M.NAME, M.AGE, M.MANAGER_ID, M.PROJECT_ID P.ID, P.NAME, P.BUDGET
from (EMPLOYEE E inner join EMPLOYEE M on E.MANAGER_ID=M.ID) inner join PROJECT P on E.PROJECT_ID=P.ID
where E.NAME='Vladimir Ilic Lenin'

Note how the query assigns an alias (E. M. or P) to each table instance. In particular, the employee table is called twice—once for the employee himself, and then again for his manager (who is of course himself an employee). FIG. 1 shows a formal representation of the table instances of this a representation of embodiments of the invention.

Thus the following data would be returned:

| E | E | E | E | E | M | M | M | M | M | P | P | P |
|---|---|---|---|---|---|---|---|---|---|---|---|---|
| 101 | Vladimir Ilic Lenin | 75 | 102 | 10 | 102 | Bill Gates | 60 | NULL | 10 | 10 | IBM Tivoli Workload Scheduler | 5,000,000 |

The join for this very simple query is rooted at the EMPLOYEE table in a first instance 11 and has two "child" tables: the PROJECT table 13 and another instance of the EMPLOYEE table 15. That is, we could fetch all the results from this query by first reading columns of the EMPLOYEE table 11 and next navigating from the root to the second instance of the EMPLOYEE table 15 and from the root to the PROJECT table 13.

Therefore, for each table instance, and accordingly a particular alias we can define a data map of table paths as follows:

| Path | Alias |
|------|-------|
| /EMPLOYEE | E |
| /EMPLOYEE/EMPLOYEE | M |
| /EMPLOYEE/PROJECT | P |

Figure 2:
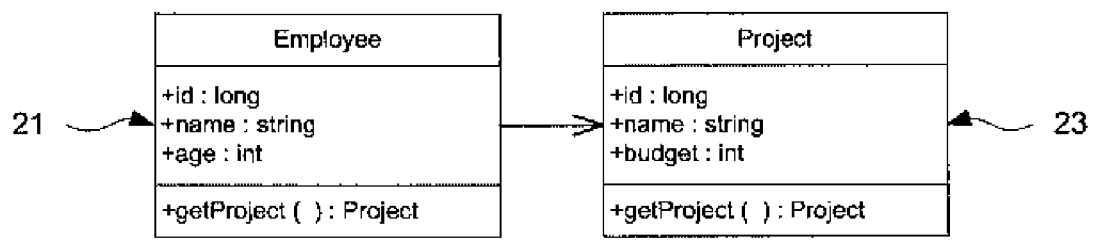
FIG. 2 shows a formal representation of the inherent relationships between tables in embodiments of the invention.

Two fetch functions can be built: fetchEmployee( ) for the EMPLOYEE table and fetchProject( ) for the PROJECT table. The first one is able to fetch fields from a generic occurrence of the EMPLOYEE table and build an Employee object, while the second one does the same with respect to the PROJECT table, which is fetched into a resulting Project object. FIG. 2 shows a formal representation of the inherent relationships between tables in embodiments of the invention. As shown in FIG. 2, the internal logic of the database dictates that every Employee object 21 allows navigating to the corresponding Project object 23 through appropriate access methods, and to another Employee object 21, acting as a manager for the current one. Such inherent relationships may be used in identifying required table instances, and thereby generating a data map.

Thus preferably each node of said tree apart from the root node thereof has a label providing a table path section, as shown above and said root node has no such label. A table path may be built up for a given node by concatenating the labels of the nodes found by traversing the tree from the root to said given node.

The algorithm starts by invoking fetchEmployee( ), and using an empty string as a current table path: the function appends a '/' character and the name of the EMPLOYEE table to the current (empty) path and looks into the map of table paths for /EMPLOYEE, finding alias "E".

Therefore, fetchEmployee( ) builds the names of the columns to be considered using "E" as a prefix, and gets the employee's data. Next, it recursively invokes the fetchEmployee( ) function, to fetch the same data for the second instance of the EMPLOYEE table. The second invocation of fetchEmployee( ) appends a '/' character and the name of the EMPLOYEE table to the current path, getting /EMPLOYEE/EMPLOYEE, and reads the corresponding alias in the map of table paths, finding "M".

Therefore, the second invocation of fetchEmployee( ) builds the names of the columns to be considered using "M" as a prefix, and gets the manager's data: the same function has been used twice to fetch different data from different occurrences of the same table. The first invocation of fetchEmployee( ) associates the resulting Employee object as a manager of the current Employee object.

Finally, the first invocation of fetchEmployee( ) invokes fetchProject( ), which returns a Project object to be associated to the current Employee object. The only invocation of fetchProject( ) appends a '/' character and the name of the PROJECT table to the current path and looks into the map of table paths for /EMPLOYEE/PROJECT, finding alias "P". Therefore the generic fetchProject( ) function knows that it must fetch columns using "P" as a prefix for names in the PROJECT table.

The core of the algorithm is the capability of navigating through the tree of table joins in the same way the algorithm navigates through invocations of "fetch" functions. Each table instance in this tree is assigned to a "table path", which uniquely identifies that instance even when the same table appears multiple times in the SQL query. A mapping between the unique table path and the alias chosen for the table instance is then used by generic functions to get specific table aliases from which they have to fetch data.

The algorithm works in the same way for more complex SQL queries. The only thing that has to be done when creating the query is to declare the list of table path mappings, so that every invocation of a "fetch" function can find the right occurrence of the table data from which it has to fetch the data. The benefit of this solution is that the code required to fetch the data is limited to a single "fetch" function for each object, which can be reused for whatever query that involves that object.

As described above there may be defined a set of "fetch" functions, each one with the ability to read the columns that belong to a specific entity in the context of the application from appropriate subsets of a database result. The mapping information contained in a tree structure instructs every generic "fetch" function to find the columns it needs to fetch within a specific query, by providing a mapping between paths in the tree and aliases used within the query as described above. When the columns have been found, the "fetch" function is able to read their content.

According to a further embodiment, each "fetch" function may be capable of fetching either the whole set of columns for which it has been created or a meaningful subset. For instance, a query involving the "employee" entity could either request just the first name and last name of every employee or the complete set of attributes, including, as an example, also the age and salary. More generally speaking, there are cases when the application may need to extract different subsets of information for the same entity, from "light" ones to medium ones and to the full one. In these cases, it preferable that the minimum set of information is requested and gathered, to maximize performance.

Thus such fetch functions comprise a first extraction process concerning a first plurality of response components, and a second extraction process concerning a second plurality of response components, wherein said second plurality of response components is a subset of said first plurality of response components. The first plurality of response components preferably comprises all components of a particular expected response.

So, every "fetch" function could be able to fetch a different subset of columns depending on the "level" of detail that is requested in that specific query. Levels could be one, two or even more, spanning from the "key" set of attributes to the complete set of all available ones. The information about the level to be considered, for example in the form of an extraction process identifier for each entity involved in the query could be added to the data map or tree structure that is already used to map table paths to aliases, so that for each node of the tree, which corresponds to an invocation of a generic "fetch" function, an additional information could specify what is the level of detail (1, 2, 3, . . . ) to be considered by that specific invocation.

The exact subset of columns to be considered for each level could be either hard-coded in the application, e.g into the logic of the fetch function (this is meaningful if there are only two or three static levels that cannot be changed by the user) or extracted from a configuration module that the user can modify (this is meaningful if there are more than three levels, and the list of attributes to be shown for each level is customizable). In the second case the generic fetch algorithm described in the invention would be able to adapt itself to whatever query involving multiple entities in the database and always fetch the results in the most performing way, according to the requested level of detail.

Although the invention has been described in terms of the structured query language, the skilled person will appreciate the invention may be implemented using any suitable database query language, such as for example IBM BS12, Tutorial D, TQL Proposal, Hibernate Query Language (HQL), OSQL, Quel or the Object Data Standard of the ODMG (Object Data Management Group).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A computer-implemented method of interrogating a database comprising a plurality of tables stored in a computer memory, said method comprising the steps of:

generating a database query and a data map, said data map describing a tree structure of table instances associated with said database query, wherein each node of said tree structure, apart from the root node thereof, has a label providing a table path section, and said root node has no such label, and a table path stored in the table path section for a given node describes a path found by traversing the tree structure from the root node to the given node;

submitting said database query to said database, said database executing in a computer system;

receiving a response from said database, said response from said database responsive to said database query;

traversing said data map so as to iteratively apply a data extraction process to components of said response corresponding to each table instance associated with said database query, thereby extracting required data from said response.

2. The method of claim 1 wherein said data map is a recursive data structure.

3. The method of claim 2 said method comprising the further steps of building a table path for a given node by concatenating the labels of the nodes found by traversing the tree from the root to said given node.

4. The method of claim 1 wherein there are defined a plurality of extraction processes from which said data extraction process is selected, each of said extraction processes being defined in correspondence with a particular information request.

5. The method of claim 4 wherein said plurality of extraction processes comprises a first extraction process concerning a first plurality of response components, and a second extraction process concerning a second plurality of response components wherein said second plurality of response components is a subset of said first plurality of response components.

6. The method of claim 5 wherein said first plurality of response components comprises all components of a particular expected response.

7. The method of claim 4 comprising a further step of generating an extraction process identifier, said extraction process identifier identifying a selected one of said plurality of extraction processes to be applied to the results of said database query, and wherein said data extraction process is the extraction process identified by said extraction process identifier.

8. The method of claim 7 wherein said extraction process identifier is incorporated in said data map.

9. The method of claim 1 wherein each table instance is assigned an alias in said data query, and said data map provides a concordance between a position in the structure defined in said data map and an alias.

10. The method of claim 1 wherein said data map is generated with reference to said data query, and to the internal logic of said database.

11. A computer program product in a computer readable storage medium comprising instructions for carrying out the steps of the method when said computer program is executed on a computer, the method comprising:
generating a database query and a data map, said data map a tree structure of table instances associated with said database query, wherein each node of said tree structure, apart from the root node thereof, has a label providing a table path section, and said root node has no such label, and a table path stored in the table path section for a given node describes a path found by traversing the tree structure from the root node to the given node;
submitting said database query to said database;
receiving a response from said database, said response from said database responsive to said database query;
traversing said data map so as to iteratively apply a data extraction process to components of said response corresponding to each table instance associated with said database query, thereby extracting required data from said response.

12. The computer program product according to claim 11 wherein there are defined a plurality of extraction processes from which said data extraction process is selected, each of said extraction processes being defined in correspondence with a particular information request.

13. A system for interrogating a database comprising a plurality of tables, the system comprising:
a processor;
a memory for storing instructions, the instructions when executed by the processor performing a method of:
generating a database query and a data map, said data map a tree structure of table instances associated with said database query, wherein each node of said tree structure, apart from the root node thereof, has a label providing a table path section, and said root node has no such label, and a table path stored in the table path section for a given node describes a path found by traversing the tree structure from the root node to the given node;
submitting said database query to said database;
receiving a response from said database, said response from said database responsive to said database query;
traversing said data map so as to iteratively apply a data extraction process to components of said response corresponding to each table instance associated with said database query, thereby extracting required data from said response.

* * * * *